United States Patent [19]

Streeter et al.

[11] 4,263,330
[45] Apr. 21, 1981

[54] METHOD FOR DRAINING WHEY FOR MAKING LARGE SIZED BLOCKS OF CHEESE

[75] Inventors: Robert R. Streeter; Vincent J. Whitehorn, both of Pollock, S. Dak.; Earl C. Nicholas, Carthage, Mo.

[73] Assignee: L. D. Schreiber Cheese Co., Inc., Green Bay, Wis.

[21] Appl. No.: 56,088

[22] Filed: Jul. 9, 1979

[51] Int. Cl.³ .................... A01J 25/11; A01J 25/13; A01J 25/15

[52] U.S. Cl. ................... 426/414; 99/456; 99/458; 100/104; 100/106; 100/107; 100/37; 210/513; 210/808; 426/36; 426/413; 426/478; 426/491; 426/512; 426/515

[58] Field of Search ............ 99/456, 457, 458; 426/8, 36, 41, 478, 491, 495, 515, 512, 517, 414, 130, 413; 100/110, 116, 104, 107, 108, 109, 106, 37; 210/514, 515, 518, 83

[56] References Cited

U.S. PATENT DOCUMENTS

| | | | |
|---|---|---|---|
| 32,820 | 7/1861 | Codding | 100/116 |
| 709,319 | 9/1902 | Hankins | 99/458 |
| 1,131,032 | 3/1915 | Berrigan | 100/116 |
| 1,159,808 | 11/1915 | Spencer et al. | 426/478 |
| 1,266,670 | 5/1918 | Fisher | 99/458 |
| 1,418,242 | 5/1922 | Fieldman | 100/116 |
| 2,423,300 | 7/1947 | Faehndrich | 426/478 |
| 2,494,637 | 1/1950 | Stine | 426/478 |
| 2,796,351 | 6/1957 | Walter et al. | 426/36 |
| 2,851,776 | 9/1958 | Crulak et al. | 99/458 |
| 2,942,983 | 6/1960 | Sadler et al. | 426/478 |
| 3,032,877 | 5/1962 | Collins | 99/458 |
| 3,100,712 | 8/1963 | Meeker et al. | 99/458 |
| 3,133,492 | 5/1964 | Crulak et al. | 100/110 |
| 3,140,185 | 7/1964 | Pinckney | 426/478 |
| 3,355,805 | 12/1967 | Krueger | 99/458 |
| 3,404,009 | 10/1968 | Lambert et al. | 426/478 |
| 3,568,316 | 3/1971 | Hensel | 99/458 |
| 3,592,127 | 7/1971 | Cooley | 100/107 |
| 3,719,994 | 3/1973 | Hensel | 99/457 |
| 3,783,166 | 1/1974 | Peters | 426/491 |
| 3,891,783 | 6/1975 | Robertson et al. | 426/478 |
| 3,969,995 | 7/1976 | Krueger et al. | 100/110 |
| 4,049,838 | 9/1977 | Krueger et al. | 426/478 |
| 4,157,680 | 6/1979 | Charles | 99/458 |

Primary Examiner—Steven L. Weinstein

[57] ABSTRACT

A method of pressing and draining whey from cheese curd particles in manufacturing large sized blocks of cheese. Cheese curd is placed into a pressing container mold which has a removable internal draining means having dimple-like projections maintaining a space between the plates of the screen. In one embodiment of the invention, pressure is applied in a vertical direction on the curd particles uniformly draining the whey. The drain means is extracted, and a second application of pressure closes remaining interstitial voids. In a second embodiment of the invention, a first application of pressure is applied to the curd particles in two separate directions at the same time. A spreading spade is inserted between substantially vertical parallel foraminous plates thereby moving these plates further apart exerting a relatively horizontal force on the curd particles and, in conjunction, a press plate pushes down on the curd particles exerting a relatively vertical force on the curd particles. As a result, the whey is uniformly drained and the curd particles are substantially fused. The internal draining means is then extracted and a second application of pressure substantially closes interstitial voids remaining from the first application of pressure. A flexible plastic liner covers the curd particles and the container is closed. The container is subjected to a vacuum chamber whereby the curd is further compressed causing free whey to run out and removing air bubbles, whereby the flexible plastic liner is sealed to the curd particles. The pressing container mold is then ready for storage or shipping.

8 Claims, 15 Drawing Figures

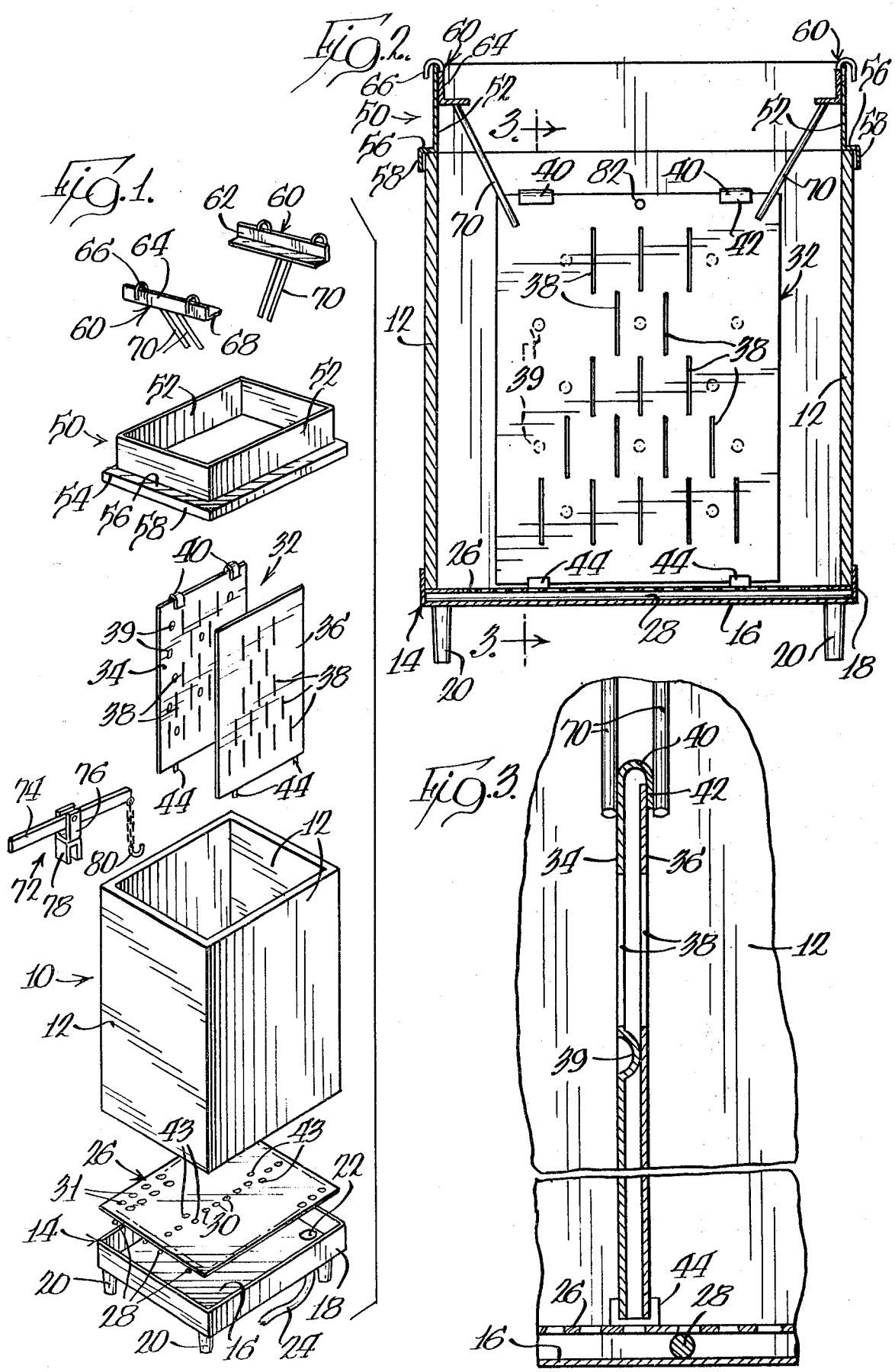

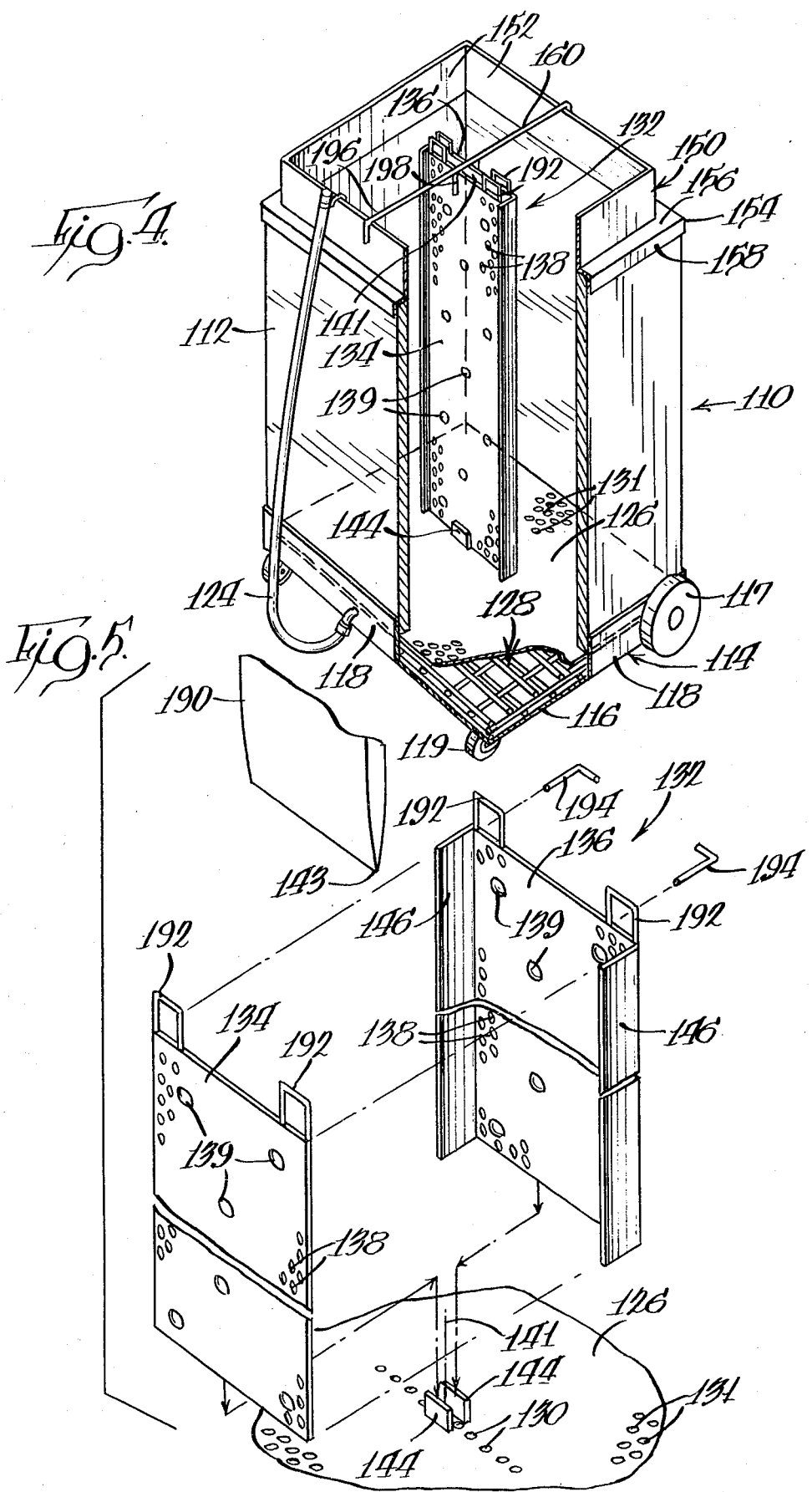

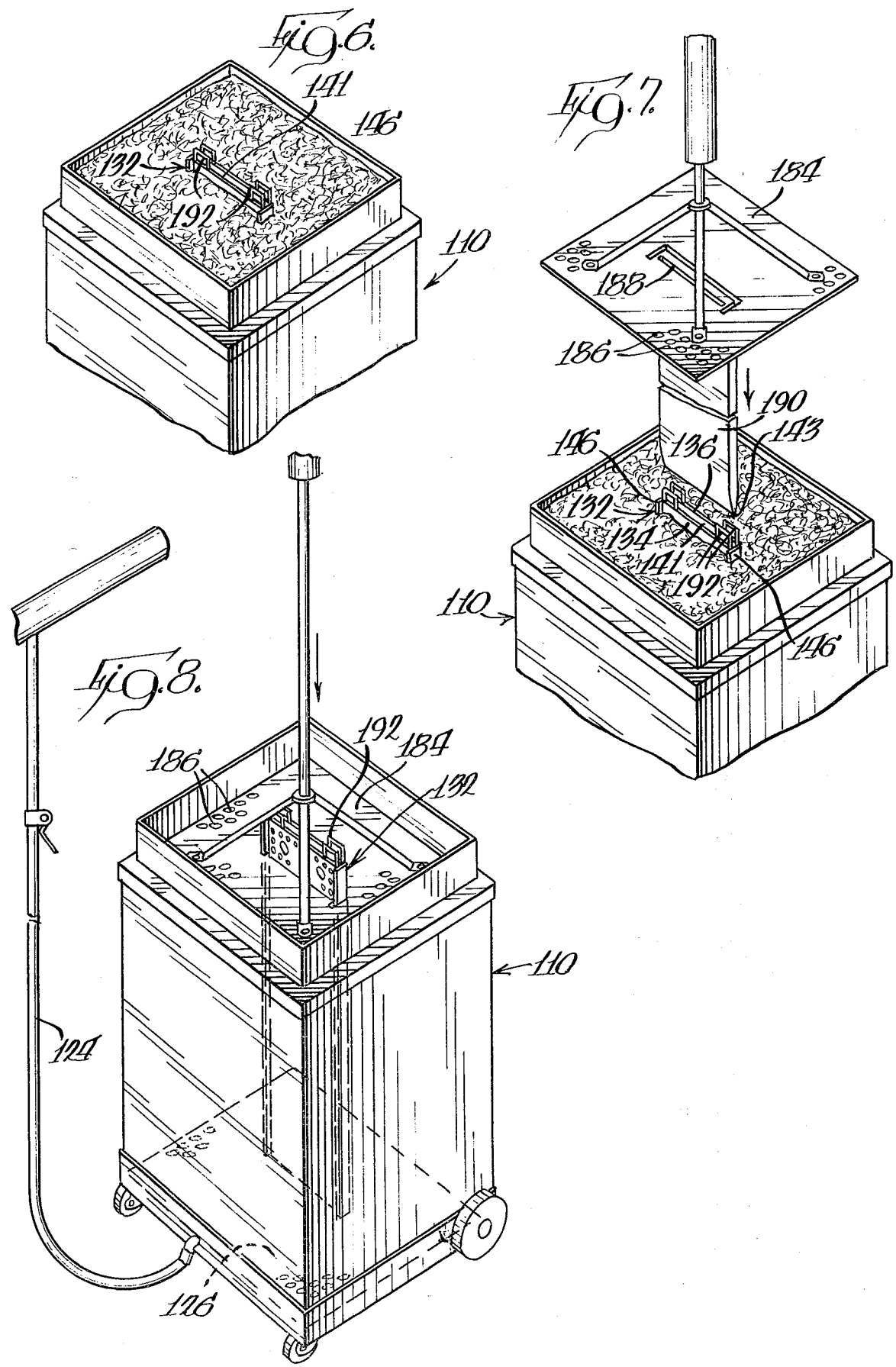

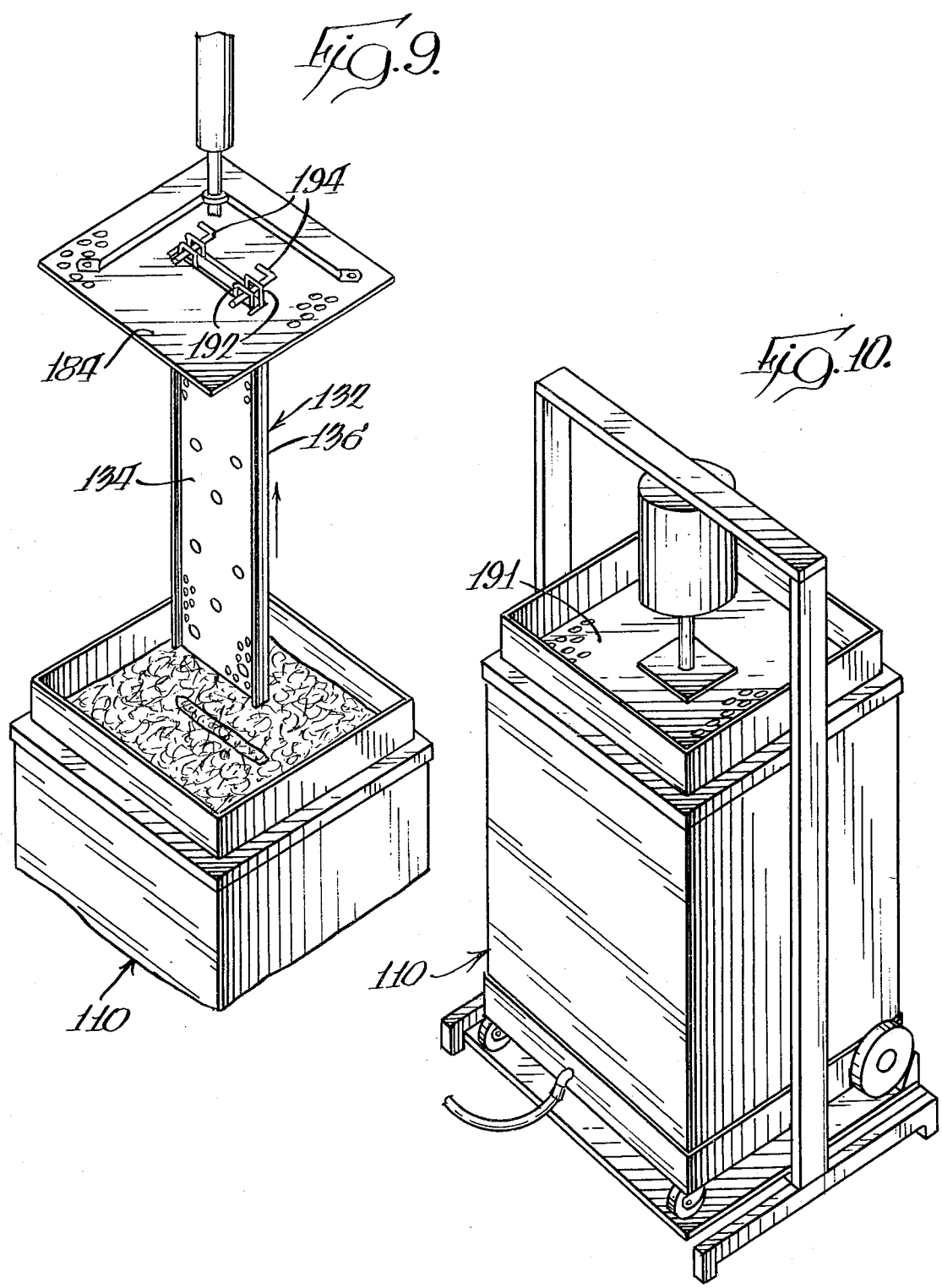

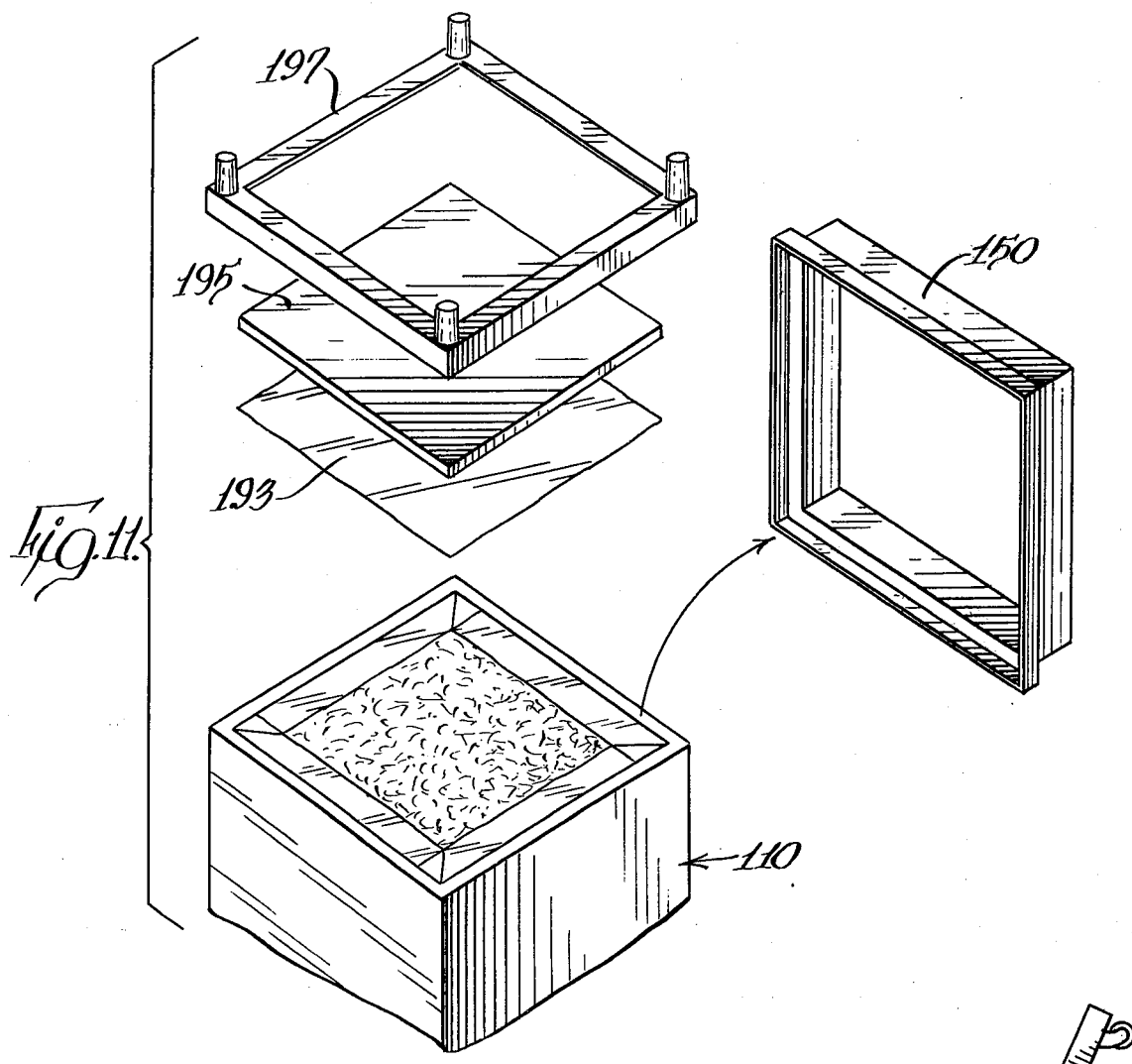
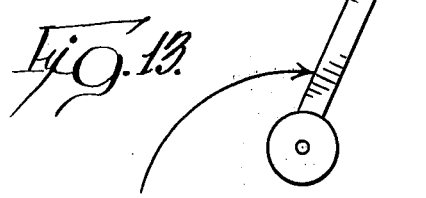
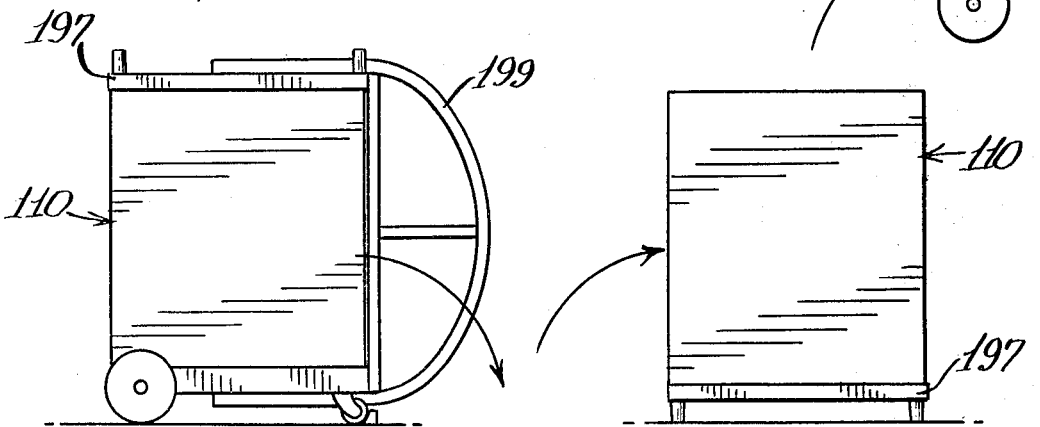

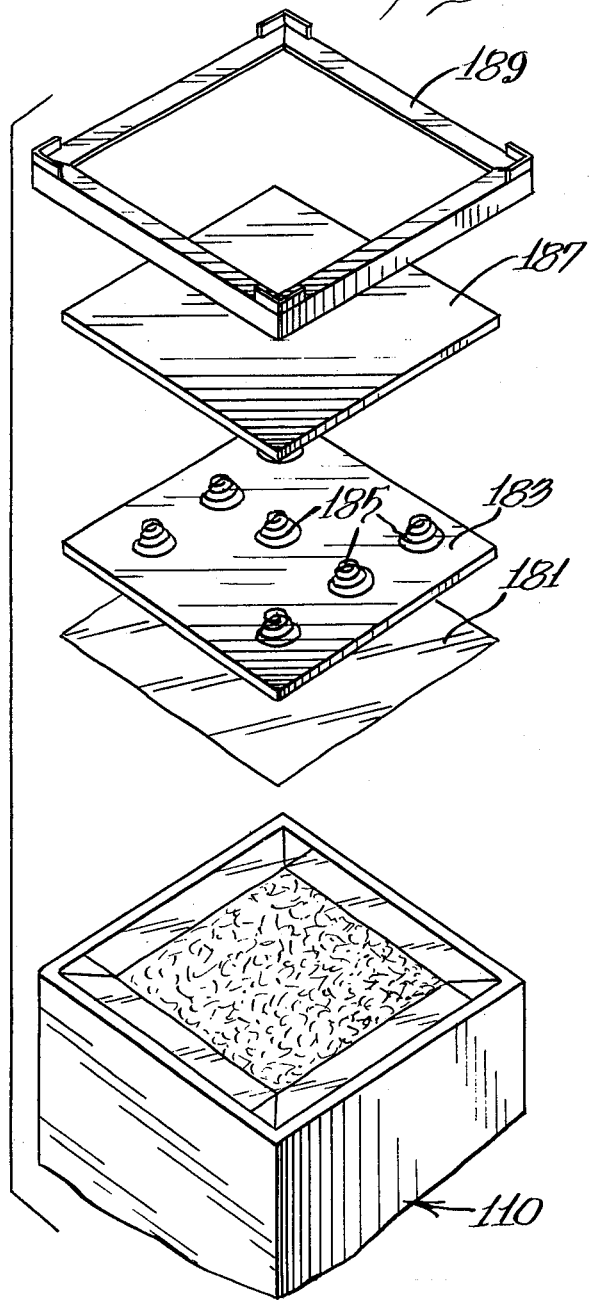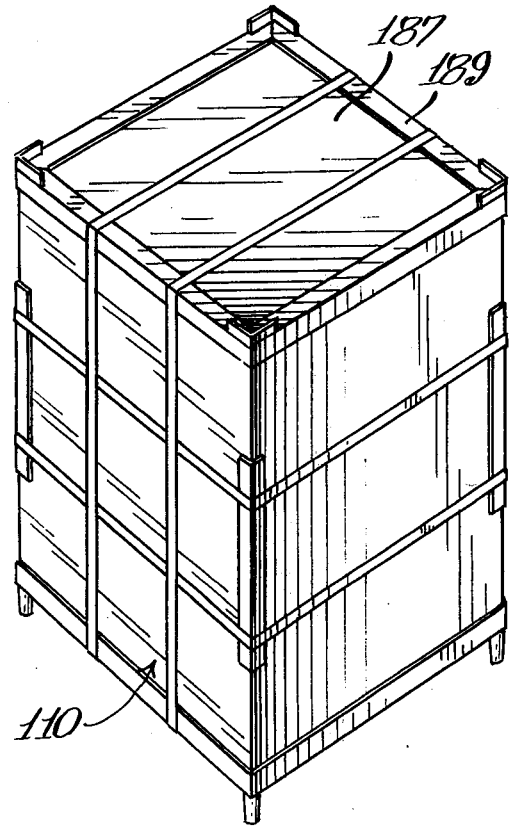

METHOD FOR DRAINING WHEY FOR MAKING LARGE SIZED BLOCKS OF CHEESE

TECHNICAL FIELD

The present invention concerns generally the manufacture of cheese, and more particularly it relates to the method and apparatus for pressing and draining whey from cheese curd particles in the production of large sized blocks of various types of natural cheese.

The process of manufacturing natural cheeses is generally carried out in accordance with the following steps: (1) a body of milk is placed in a cheese vat and an acid starter is introduced to ripen the milk; (2) after a desired level of acidity is obtained, a curdling agent is added to coagulate the milk; (3) when the curd has obtained sufficient firmness, the curd is cut into small cube particles; (4) the curd particles are stirred in the whey and are cooked over a period of time until various levels of desired acidity are reached; some quantities of whey are drained from the vat; and (6) the curd is subjected to a variety of treatments depending on the natural cheese desired, which includes a salting that promotes the expulsion of additional whey from the curd. At this time, the vital step in manufacturing a large sized block of cheese involves placing this partially drained curd particle material into a mold where pressure can be applied to further drain sufficient quantities of whey from the curd. Once the block has been formed, it is exposed to different temperatures over varying periods of time to develop selected types of cheese that will have pedictable textures, aromas, and flavors.

In recent years, the cheese industry has found it to be profitable to manufacture large sized blocks of cheese. As disclosed in U.S. Pat. No. 3,355,805, blocks of cheese as large as 700 pounds can be produced and readily divided and packaged for consumer use.

In order to make the large sized blocks of cheese a profitable endeavor in comparison to smaller scales of production, utility of the entire block must be maximized. Thus, the total volume of interstitial voids that can develop in the cheese block during the pressing and draining process must be minimized to reduce mechanical openness and to improve the texture of the cheese. In addition, the moisture content must be substantially uniform throughout the entire block to maintain a predictable product and to avoid localized high moisture content anamolies so as to prevent undesirable flavors, short brittle bodies and in soft pasty bodies forming at different portions of the cheese block which are unusable.

Background Art

U.S. Pat. No. 3,355,805 discloses apparatus capable of draining whey for the manufacture of large sized blocks of cheese weighing approximately 700 pounds. The container of this apparatus has draining apertures positioned only on its top and bottom ends. This device applies pressure to the curd particles through the end of the container thereby using pressure in a single plane. As a result, when pressure is applied to the cheese curd particles, whey located in the inner reaches of the container must migrate through a substantial amount of curd particle resistance to reach the draining apertures at the outer ends of the container. Furthermore, this disclosure requires cumbersome equipment to suspend the pressing container and to successively tilt the pressing container to pour off the drained whey.

U.S. Pat. Nos. 3,969,995 and 4,049,838 respectively disclose and apparatus and method to press and drain cheese curd particles into large sized blocks of cheese. That disclosed apparatus provides for internal draining mechanisms to press the cheese curd particles from the top and bottom of the pressing container. These internal draining mechanisms are V-shaped foraminous blades which are orientated so that the narrowest ends of the blades penetrate the curd material the furthest. Even at the most extensive point of penetration, the V-shaped blades do not pass the mid-section of the pressing container. Due to the V-shaped configuration of the blades, the curd particle material is displaced nonuniformly. Furthermore, the disclosure calls for substantial pivotal support apparatus to suspend, to rotate and to hold the pressing container in a 90° from an initial upright position to drain the whey from some of the V-shaped blades. This whey is spilled out onto the floor and is not recovered.

Other typical apparatus for making large sized blocks of cheese are disclosed in other U.S. Pat. Nos. 2,851,776; 3,100,712; 3,133,492; 3,568,316; and 3,719,994.

DISCLOSURE OF THE INVENTION

In the present invention a whey draining mechanism is centrally positioned within the pressing container mold and is then surrounded by cheese curd particle material. This draining mechanism is constructed of two narrowly spaced, foraminous plates which communicate with a row of apertures of a perforated drain plate which encloses the bottom of the press container mold. These plates are retained in parallel relationship with one another by spacer means that extends outwardly from at least one plate and bears against a facing surface of the other plates. In accordance with the present invention, the spacer means takes the form of a multiplurality of dimples, or projections, that are struck outwardly for one of the plates and which include a rounded surface that engages the other plate. These plates stand vertically erect and extend substantially to the top of the container. Substantial quantities of whey and free moisture are expelled from the container through the row of apertures of the drain plate from the drain mechanism, as well as directly through the other perforations of the drain plate during the process of filling the container due to unassisted gravity flow. When pressure is applied to the cheese curd particles held within the press container mold, residual whey and free moisture are forced from the curd particles and exit the container by utilization of the immersed internal draining mechanism in communication with the drain plate, as well as the drain plate alone.

This invention possesses a distinct advantage over prior devices such as those shown in U.S. Pat. No. 3,355,805 which produce large sized blocks of cheese without utilizing an internal draining mechanism. In the present invention, whey has less distance to travel to reach the internal draining mechanism and therefore experiences less resistance from the curd particles to exit the container than aforesaid prior device having no such mechanism. With less resistance there is far less likelihood that whey or free moisture will remain in the curd which would cause unusable high moisture content anamolies. In addition, in accordance with one aspect of this invention a pressure is exerted on the curd particles in two planes simultaneously with the use of a press plate and spreading spade. The press plate exerts a pressure in a vertical direction and the spreading spade by pushing apart the plates of the vertically placed draining mechanism exerts a pressure in a horizontal direction unlike the unidirectional application of pressure by the apparatus of U.S. Pat. No. 3,355,805, thereby having an advantageous squeezing effect on the curd particles. This squeezing effect further reduces the possibility of having deleterious whey or free moisture remaining in the curd particles. Furthermore, in the present invention, no cumbersome apparatus is required to tilt the container in order to pour off draining whey. The whey expels through the bottom drain plate and whatever whey may come out through the top press plate can be easily aspirated.

A desirable advantage of this invention over that disclosed in U.S. Pat. Nos. 3,969,995 and 4,049,838 is further reduction of the possibility of the occurrence of interstitial voids and high moisture content cheese curd anamolies. The occurrences of either of these conditions reduce the utility of the entire block of cheese. Interstitial voids are minimized because the present invention calls for a narrowly spaced parallel plate construction of the internal drain screen which even when spread apart in accordance with one aspect of this invention it is done uniformly by the spreading spade creating a disturbance more easily repaired in the curd material than several V-shaped blades. The present invention has an internal drain screen which is centrally located and evenly distributed in the press container mold compared to V-shaped blades of aforesaid prior art, which vary in width while immersed in the curd material and which do not pass the mid-point of the container at the furthest penetration. As a result of having a more evenly distributed draining mechanism in this invention, there is less likelihood of high moisture content anamolies. The present invention is therefore enabling greater potential for utility of the entire cheese block and a more consistent product. An additional advantage of this invention is that it provides for sanitary whey recovery by pumping the draining whey as it flows out of the container and collecting it for other uses.

BRIEF DESCRIPTION OF THE DRAWINGS

The drawings illustrate the best mode presently contemplated for carrying out the invention.

In the drawings:

FIG. 1 is an exploded perspective view of the container to receive and hold the cheese curd and the remaining apparatus necessary to fully assemble the pressing and draining container;

FIG. 2 is an enlarged vertical sectional view of the embodiment of FIG. 1;

FIG. 3 is an enlarged sectional view taken substantially through a plane indicated by section line 3—3 in FIG. 2;

FIG. 4 is a perspective view, partly broken away, of a second embodiment of the present invention;

FIG. 5 is a partly broken exploded perspective view of the internal drain screen mechanism of the embodiment of FIG. 4;

FIG. 6 is a fragmentary perspective view of a filled container of the embodiment of FIG. 4;

FIG. 7 is a fragmentary perspective view showing the press plate and the spreading spade being inserted into a filled container of the embodiment of FIG. 4;

FIG. 8 is a perspective view of the press plate and spreading spade fully inserted into a filled container of the embodiment of FIG. 4;

FIG. 9 is a fragmentary perspective view showing the internal drain screen mechanism being extracted from the filled container of the embodiment in FIG. 4;

FIG. 10 is a perspective view showing a second application of pressure to a filled container of the embodiment of FIG. 4;

FIG. 11 is a fragmentary exploded perspective view showing the top open end of the container being closed of the embodiment of FIG. 4;

FIG. 12 is a side elevational view on a reduced scale of the closed container being positioned to be inverted in the embodiment of FIG. 4;

FIG. 13 is a side elevational view showing the container in FIG. 12 having been inverted in the embodiment of FIG. 4;

FIG. 14 is a fragmentary exploded perspective view showing the now top open end of the container being closed with a spring loaded lid in the embodiment of FIG. 4; and FIG. 15 is a perspective view of the container strapped closed in the embodiment of FIG. 4.

BEST MODE FOR CARRYING OUT THE INVENTION

While this invention is susceptible of embodiment in many different forms, there is shown in the drawings and will herein be described in detail preferred embodiments of the invention. It should be understood, however, that the present disclosure is to be considered as an exemplification of the principles of the invention and is not intended to limit the invention to the embodiments illustrated. The scope of the invention will be pointed out in the appended claims.

The precise shapes and sizes of the components herein described are not essential to the invention unless otherwise indicated, since the invention is described with reference to embodiments which are simple and straight forward.

In the following description, two digit numerals are used to refer to the embodiment illustrated in FIGS. 1-3; three digit numerals in the one hundred series are used to refer to a second species of this invention involving an internal drain screen mechanism which moves apart the embodiment illustrated in FIGS. 4-15; and the same last two digits in each numeral designate similar or functionally analogous elements in the two embodiments.

The apparatus of this invention has certain conventional mechanisms, the details of which though not fully illustrated or described, will be apparent to those having skill in the art and an understanding of the necessary functions of such mechanisms.

The choice of materials is dependent upon the particular application involved and other variables, as those skilled in the art will appreciate. FIGS. 1-3 illustrate an apparatus for pressing and draining cheese curd particles into large sized blocks of cheese which comprises in general a pressing mold container 10 which holds the cheese curd particles and forms the shape and size of the desired block of cheese.

Mold 10 is generally rectangular in cross-section having two open ends defined by the sidewalls 12 of container 10. The sidewalls 12 are generally constructed of plywood with the interior surface lined with a plastic liner to receive the cheese curd particles. The plastic liner material is used to cover the drained curd particles to protect against contamination.

Container 10 is supported by a drain pan 14 which is comprised of a rectangular plate 16 having four wall members 18 rising vertically from the edges of rectangular plate 16 thereby forming a box with a top open end. Four wall members 18 define the top open end which has a configuration that conforms to the exterior configuration defined by sidewalls 12 enabling the container 10 to be snugly received by base drain pan 14 as illustrated in FIG. 2. The drain pan has four support legs 20 emanating from each bottom surface corner of rectangular plate 16. An aperture 22 is provided in rectangular plate 16 and is elevated from the floor by the support legs and to permit the attachment of a flexible whey excavator hose 24 to the bottom surface of rectangular plate 16 in communication with aperture 22. Whey which collects in hose 24 is withdrawn by attaching hose 24 to a vacuum pump. Also, if desired, wheels may be used as a substitute for support legs 20. This entire base drain pan 14 assembly collects draining whey from pressing container mold 10 and conducts this whey away from the vicinity of pressing container mold 10 by hose 24.

The embodiment of FIGS. 1-3 also includes a drain plate 26 comprising a rectangular metallic member which encloses the bottom open end of pressing container mold 10 by being of the same size and configuration as the exterior surfaces of pressing container mold 10 defined by sidewalls 12 and at the same time conforming to the interior dimensions of base drain pan 14, as illustrated in FIG. 2. Pressing container mold 10, when positioned in base drain pan 14, rests on drain plate 26. A plurality of apertures 31 are disposed uniformly in rows in plate 26, and permit draining whey to pass therethrough, as will hereafter appear. Metal bars 28 are welded to the bottom surface of drain plate 26 in order to maintain drain plate 26 separated from rectangular plate 16 of base drain pan 14 and thereby maintain the row of plurality of apertures 30, which are disposed in a central longitudinal line of drain plate 26 and the remaining plurality of apertures 31 uniformly distributed in rows in drain plate 26, unobstructed and allow whey draining from pressing container mold 10 to freely enter base drain pan 14. Bars 28 may be eliminated and the drain plate may be supported in spaced relationship above drain pan 14 by bending over opposite edges of the drain plate to provide flanges that rest upon the drain pan to support the drain plate thereabove. A cloth bandage is generally placed onto drain plate 26 before filling container 10. The bandage is composed of a porous material to allow whey to pass through but not the curd particles.

An internal drain screen means 32 is provided in the embodiment of FIGS. 1-3, and is the mechanism which receives draining whey from the cheese curd material while located within pressing container molds 10. Internal drain screen means 32 is comprised of two parallel plates 34 and 36 which extend substantially the height of container mold 10, as illustrated in FIG. 1 and FIG. 3. Plates 34 and 36 are rectangular in shape and are composed of a suitable material such as stainless steel. Plates 34 and 36 each define a multiplicity of openings or slits 38 being a plurality of slits 38 preferably about 4 inches in length and 3/32 inch in width being distributed in five horizontal rows. The top row having three slits; the second row having two slits; the third row having three slits; the fourth row having four slits; and the bottom row having five slits. The slits of each row are staggered in alignment relative to the slits in the adjacent row(s), thus a slit 38 in any given row will not align with slit 38 of an adjacent row as illustrated in FIG. 2. An alternative embodiment of a multiplicity of openings 38 can be right cylindrical bores grouped into small rows and each small row would be comparable to a slit 38. These small rows would be distributed in a pattern in plates 34 and 36 as previously described for slits 38. Internal drain screen means 32 is 12 inches wide and 30 inches high and therefore is somewhat less than coextensive with the dimension between sidewalls 12 of pressing container mold 10 and is centered between sidewalls 12, as illustrated in FIG. 2.

Plates 34 and 36 are maintained in spaced parallel relationship by projections in the form of a multiplicity of dimples 39 that are pressed out of plate 34 and protrude about ⅛ inch from the surface of plate 34 and are oriented so that exterior convex surfaces of dimples 39 face and contact plate 36, as illustrated in FIG. 3. Dimples 39 are located uniformly and substantially over the entire plate 34 thereby keeping plates 34 and 36 about ⅛ inch apart and generally parallel.

Plate 34 has two U-shaped tabs 40 each emanating from each corner of the top edge of plate 34. Lip portion 42 of each U-shaped tab 40 embraces the outer surface of plate 36 thereby preventing plates 34 and 36, as illustrated in FIG. 3 from moving relative to one another.

Drain plate 26, as illustrated in FIGS. 2 and 3, has two upwardly extending indexing lugs 44 welded to the interior surface of drain plate 26. Lugs 44 are of U-shaped configuration oriented to loosely receive plates 34 and 36 and thereby support and secure the bottom portion of internal drain screen means 32 and to maintain the plates in parallel spaced apart relationship. Furthermore, lugs 44 of drain plate 26 are located in drain plate 26 to position the internal drain screen means 32 over row of plurality of apertures 30 when plates 34 and 36 are inserted into said indexing lugs 44. In an alternative embodiment, as illustrated in FIG. 1, plates 34 and 36 are each provided with a pair of pins 43 located on the bottom edge of plates 34 and 36 which are inserted into openings 46 defined in drain plate 26. Openings 46 are oriented whereby when pins 43 are disposed in openings 46, internal drain screen means 32 is positioned to communicate with row of plurality of apertures 30.

The apparatus of FIGS. 1-3 also includes a fill collar 50, which is comprised of four wall members 52 which form a collar having the same dimension and configuration as the interior of pressing container mold 10. The bottom edges of wall members 52 rest on the top edges of sidewalls 12 of pressing container mold 10, as illustrated in FIG. 2. A right-angled flange 54 extends from the lower edge of wall members 52 and is comprised of horizontal leg 56 and vertical leg 58, as illustrated in FIG. 2. Horizontal leg 56 is of sufficient length to allow vertical leg 58 to snugly fit over the top exterior portion of sidewalls 12 of pressing container mold 10. Fill collar 50 is thereby held on top of pressing container mold 10 while pressing container mold 10 is being filled with cheese curd material thereby preventing spillage and providing support for a centering means for the internal drain mechanisms. Different types of centering means are contemplated by the present invention, including but not limited to the centering brackets 60 shown in FIGS. 1-3.

Each centering bracket 60 is positioned on opposing wall members of fill collar 50, as illustrated in FIG. 1 and FIG. 2 and is comprised of an L-shaped rail 62 which has a length somewhat less than the length of wall member 52 of fill collar 50. Upper leg 64 of L-shaped rail 62 has two hooks 66 which locate upper leg 64 in parallel contact with the upper interior surface of wall member 52 so that lower leg 68 to project into the interior of fill collar 50, when hooks 66 hang over the upper edge of wall member 52, as illustrated in FIG. 1 and FIG. 2. Each centering bracket 60 has two parallel rods 70 welded to the lower surface of lower leg 68. Rods 70 project downward and angle into the interior of pressing container mold 10, as illustrated in FIG. 2, and engage internal drain screen means 32 by contacting and straddling the upper portion of internal drain screen means 32, as illustrated in FIG. 3. Centering brackets 60 thereby maintain internal drain screen means 32 in a vertical posture in the center of pressing container mold 10 while curd material is placed in pressing container mold 10.

The embodiment of FIGS. 1–3 is also provided with a drain screen removal means 72 which comprises a lever 74 centrally mounted on a pivot bracket 76 allowing lever 74 to freely rotate. Pivot bracket 76 is welded to a means for mounting said lever 74 for pivotal movement 78 comprised of a U-shaped channel mount wherein the opening of the U-shaped channel mount is of sufficient size and oriented to firmly engage a top portion of a sidewall 12 whereby enabling lever 74 having a hook portion 80 hanging downward from the end portion of lever 74 to project over the top of pressing container mold 10. Hook portion 80 may then engage an opening 82 defined in the top central portion of plates 34 and 36, as illustrated in FIG. 2, of the internal drain screen means 32 whereby when a sufficient downward force is applied to the end of lever 74 opposite that having hook 80, internal drain screen means 32 will be extracted from pressing container mold 10 causing insignificant disturbance to the cheese curd material.

The embodiment of FIGS. 1–3 is assembled by placing drain plate 26 into base drain pan 14. Pressing container mold 10 is positioned into base drain pan 14 and onto drain plate 26. Internal drain screen means 32 is then placed into container mold 10. Fill collar 50 is then positioned onto container mold 10 and centering brackets 60 are hung from fill collar 50 and engage internal drain screen means 32 to maintain the internal drain screen means 32 in a relatively vertical position while container mold 50 is being filled with cheese curd particles. Once container mold 10 is filled centering brackets 60 are then removed and pressure is applied to the curd particle. When sufficient whey has been drained, internal drain screen means 32 is removed by removal device 72 and a final pressure is applied to close remaining interstitial voids.

Turning now to the embodiment of FIGS. 4–9 an apparatus is illustrated for pressing and draining the cheese curd particles into large sized blocks of cheese which comprises in general a pressing mold container 110 which holds the cheese curd particles and forms the shape and size of the desired block of cheese.

The embodiment of FIGS. 4–9 has a pressing container mold 110 which is generally rectangular in cross section having two open ends defined by the sidewalls 112 of the container. The sidewalls 112 are generally constructed of plywood with the interior surface lines with a plastic liner to receive the cheese curd particles. Plastic liner material is used to cover the drained curd particles to prevent contamination.

Container 110 is supported by a base or drain pan 114 which is comprised of a rectangular plate 116 having four wall members 118 rising vertically from the edges of rectangular plate 116 thereby forming a box with a top open end. Four wall members 118 define the top open end which has a configuration that conforms to the exterior configuration defined by container 110 sidewalls 112 enabling the container to be snugly received by drain pan 114 as illustrated in FIG. 4. Two opposing wall members 118 have unidirectional wheels 117 attached and rectangular plate 116 has two multidirectional caster wheels 119 attached whereby these wheels provide easy maneuverability of container 110. A whey excavator hose 124 communicates with drain pan 114 through a wall member 118 as viewed in FIG. 4. Whey excavator hose 124 is attached to a vacuum pump whereby any whey which collects in drain pan 114 is pumped through hose 124 and thereby sanitarily collected for reuse.

Drain plate 126 is a rectangular metallic plate which encloses the bottom open end of pressing container mold 110 by being of the same size and configuration as the exterior surfaces of pressing container mold 110 defined by sidewalls 112 and at the same time conforming to the interior dimensions of base drain pan 114. Pressing container mold 110, when positioned in drain pan 114 rests on drain plate 126. Metal bars 128 are welded to the bottom surface of drain plate 126 in order to keep drain plate 126 separated from rectangular plate 116 of drain pan 114 and thereby maintain the row of plurality of apertures 130, which are disposed in a central longitudinal line of drain plate 126 and the remaining plurality of apertures 131 uniformly distributed in drain plate 126 as viewed in FIG. 5, unobstructed and allow whey draining from pressing container mold 110 to freely enter drain pan 114. A permeable cloth bandage is generally placed onto drain plate 126 before filling container 110. The bandage is composed of a porous material to allow whey to pass through but not the curd particles.

An internal drain screen means 132 is provided in this embodiment and is the mechanism which receives draining whey from the cheese curd material while located within pressing container mold 110 as viewed in FIG. 4. Internal drain screen means 132 is comprised of two genrally parallel spaced apart plates 134 and 136 as viewed in FIGS. 4 and 5. Plates 134 and 136 are approximately 12 inches in width and are substantially the height of container mold 110. Plates 134 and 136 are generally rectangular in shape and are composed of a suitable material such as stainless steel. Plates 134 and 136 each define a multiplicity of openings 138 preferably being right cylindrical bores of approximately $\frac{1}{4}$ inch in diameter and being uniformly distributed throughout plates 134 and 136 as illustrated in FIGS. 4 and 5. An alternative embodiment would be a plurality of slits preferably being about 4 inches in length and 3/32 inch in width being distributed in a staggered fashion in plates 134 and 136 as illustrated in FIG. 2. Internal drain screen means 132 is somewhat less than coextensive with the dimension between sidewalls 112 of pressing container mold 110 and is centered between sidewalls 112, as illustrated in FIG. 4.

Plates 134 and 136 are maintained in spaced parallel relationship defining a space 141 as viewed in FIGS. 4 and 5 by having a means for maintaining said space or multiplicity of dimples 139 that are punched out in plates 134 and 136. Dimples 139 protrude about ⅜ inch from the surface of plates 134 and 136 and are oriented so that exterior convex surfaces of dimples 139 face and contact their opposing plate, as illustrated in FIG. 5. Dimples 139 are located uniformly and substantially over the entire plates 134 and 136 thereby keeping the plurality of openings 138 unobstructed so as to allow draining whey to flow through these openings 138.

Space 141 defined between plates 134 and 136 communicate with a row or plurality of apertures 130 as viewed in FIG. 5. Draining whey which enters space 141 escapes container 110 by flowing out of apertures 130. Indexing lugs 144 are metallic tabs welded to drain plate 126 as viewed in FIG. 5. Lugs 144 straddle row or plurality of apertures 130 and are adequately spaced apart to receive plates 134 and 136 and to allow plates 134 and 136 to move apart at least one inch and still maintain space 141 communicating with apertures 130.

A plate, first plate or female plate 136 has its side edges bent normal to the main portion of plate 136, as viewed in FIG. 5. Bent edges 146 project approximately two inches from the main portion of female plate 136 and define a channel whereby male plate 134 may slide therein as viewed in FIG. 4. Male plate 134 is generally a flat wall member except for dimples 139. Bent edges 146 function to maintain male plate 134 in alignment with female plate 136 when plates 134 and 136 are moved apart. Bent edges 146 also function to keep curd particle material from entering space 141 when container mold 110 is filled as viewed in FIG. 6.

Means for applying pressure, press frame or pressure plate 184 is comprised of a metallic plate having the size and configuration conforming to the top opened end of container 110 as viewed in FIGS. 7 and 8. Press plate 184 defines perforations or a multiplicity of apertures 186 which are uniformly distributed throughout the entire press plate 184. When pressure is applied to the cheese curd particles as viewed in FIG. 8 whey may be expelled through apertures 186 which can be easily aspirated away from press plate 184. Press plate 184 further defines a slot 188 as viewed in FIG. 7. Slot 188 is adequately dimensioned to receive the top portion of internal drain screen means 132 when press plate 184 is lowered into the cheese curd as viewed in FIG. 8. In addition, press plate 184 has a means for moving apart plates 134 and 136 or speading spade 190 welded to a central portion of pressing plate 184 and projecting substantially vertically downward from plate 184 as viewed in FIG. 7. Spreading spade 190 comprises a metallic wall member being substantially uniform in thickness of approximately one inch and having a width somewhat less than the distance between bent edges 146 of female plate 136 and a length substantially that of the height of internal drain screen mechanism 132. Spreading spade 190 has a tapered end 143 to facilitate piercing space 141 of internal drain screen means 132 when press plate 184 is lowered into container mold 110 as viewed in FIGS. 7 and 8. Spreading spade 190 when piercing space 141 contacts dimples 139 thereby moving plates 134 and 136 apart. Thus, when press plate 184 is lowered into container 110 causing spreading spade 190 to enter space 141 pressure is thereby applied to the cheese curd material in two separate planes simultaneously. Press plate 184 exerting a relatively vertical pressure on the cheese curd material and spreading spade 190 exerting a relatively horizontal pressure on the cheese curd material.

Means for guiding the means for moving apart plates 134 and 136 or handles 192 are comprised of metallic loops projecting vertically from the top edges of plates 134 and 136 as viewed in FIGS. 4 through 9. Handles 192 project out of the cheese curd material as seen in FIG. 6 when container 110 is filled. Handles 192 enable spreading spade 190 to be easily guided into space 141 defined by plates 134 and 136 as viewed in FIG. 7. Handles 192 function as a catching mechanism for extracting internal drain screen means 132. By placing pins 194 comprising L-shaped metallic rods which have a length greater than the width of slot 188 defined in press plate 184, into handles 192 the internal drain screen means 132 can be easily extracted when press plate 184 is removed from container mold 110 as viewed in FIG. 9.

This apparatus also includes a fill collar 150 which is comprised of four wall members 152 which form a collar having the same dimension and configuration as the interior of pressing container mold 110. The bottom edges of wall members 152 rest on the top edges of sidewalls 112 of pressing container mold 110, as illustrated in FIG. 4. A right angled flange 154 is attached and extends from the lower edge of wall members 152 wherein right angled flange 154 is comprised of a horizontal leg 156 and vertical leg 158 as illustrated in FIG. 4. Horizontal leg 156 is of sufficient length to allow vertical leg 158 to snugly fit over the top exterior portion of sidewalls 112 of pressing container mold 110. Fill collar 150 is thereby held on top of pressing container mold 110 while pressing container mold 110 is being filled with cheese curd material and during the pressing process whereby preventing spillage and providing support for centering means for the internal drain screen. Different types of centering means are contemplated by the present invention, including but not limited to centering bracket 160 shown in FIG. 4. Centering bracket 160 comprises a metallic bar 196 which is suspended across the opening defined by sidewalls 152 of collar 150 as viewed in FIG. 4. Metallic bar 196 has two spaced apart metal tabs 198 projecting vertically downward from metallic bar 196. Metallic tabs 198 engage the top portion of internal drain screen means 132 thereby supporting internal drain screen means 132 in substantially vertical posture during the filling of container 110.

FIGS. 4–15 illustrate a method for pressing and draining whey from cheese curd particles utilizing the apparatus of the second embodiment of this invention. It should be understood that whey may include other constituent fluids, such as water which is added to cheese curd in the production of particular natural cheeses.

In FIGS. 4, 5 and 6, drain plate 126 defining a plurality of apertures 131 is placed into base drain pan 114. The bottom open end of container 110 is enclosed by placing container 110 onto drain plate 126. Container 110 is lined with a flexible plastic material and a permeable plastic weave cloth is placed over the interior surface of drain plate 126. Plates 134 and 136 defining a multiplicity of openings 138 and spaced apart by dimples are joined together and placed between indexing lugs 144. Centering bracket 160 then engages the top portion of internal drain screen means 132 until container 110 is sufficiently filled with cheese curd particles whereby internal drain screen means 132 is supported by the cheese curd particles.

In FIG. 6 the cheese curd particles are allowed to settle for several minutes expelling whey due to the weight of the curd.

In FIG. 7 press plate 84 is lowered into the cheese curd while at the same time spreading spade 190 inserts between plates 134 and 136. In FIG. 8, a first pressing occurs whereby a pressure of approximately 15 to 20 pounds per square inch is applied for approximately 3 to 5 minutes. Whey which is expelled through drain plate 126 is vacuumed pumped through excavator hose 124 and sanitarily recovered for reuse. During this first pressing two forces are exerted on the cheese curd particles each of which are in a different plane. Press plate 184 is exerting a relatively vertical force on the cheese curd particles while spreading spade 190 contacts dimples 139 of plates 134 and 136 and pushes these plates apart exerting a relatively horizontal force on the cheese and particles.

In FIG. 9, pins 194 are inserted through handle 192 of plates 134 and 136 and thereby catch press plate 184 when press plate 184 is removed from container 110. Thus, by removing press plate 184 internal drain screen means 132 is extracted from the cheese curd material with minimal disturbance to the cheese curd.

In FIG. 10, a perforated follower plate 191 is placed into top open end of container 110. A ram exerts a second pressure to the cheese curd material at about 30 to 50 pounds per square inch for approximately 45 to 90 minutes closing any remaining interstitial voids in the cheese curd and expelling any remaining whey.

The follower plate 191 and fill collar 150 are then removed from container 110. A flexible plastic sheet 193 is placed over the cheese curd and overlaps the flexible plastic lines in container 110. Bottom lid 193 is placed over sheet 193 and leg bracket 197 secures bottom lid 195 as viewed in FIG. 11.

Container 110 is then inverted with the aid of tipping device 199 as illustrated in FIGS. 12 and 13.

Drain pan 114 and drain plate 126 are removed from container 110. Second flexible plastic sheet 181 is placed over the cheese curd material and overlaps the flexible plastic liner as viewed in FIG. 14. Follower board 183, being slightly smaller than the interior dimensions of container 110 to permit movement is inserted into container 110. Approximately 7 or 8 coil springs 185 are placed on top of follower board 183 evenly spaced. Top container board 187 is then placed on top of coil springs 185. Top container iron bracket 189 is then placed on top of top container board 187.

The container 110 assembly is then strapped as viewed in FIG. 15. In strapping container 110, top container iron bracket 189 and top container board 187 are pushed down thereby compressing coil springs 185 and applying pressure to the cheese curd.

The entire container 110 assembly is placed into a vacuum chamber with an atmospheric pressure reduction of approximately 27 inches mercury for about ½ to 2½ hours. While in the vacuum chamber the warm curd mass is completely compressed and the coil springs 185 cause follower board 183 to follow the reduced size of the curd mass and hold this pressurized position until such time as the container 110 assembly is opened for use. While under vacuum compression all pockets of trapped air and moisture are expelled around edges of the flexible plastic sheets to form a skin tight sealed package.

observed that numerous variations and modifications may be effected without departing from the true spirit and scope of the novel concept of the invention. It is to be understood that no limitation with respect to the specific apparatus or method illustrated herein is intended or should be inferred. It is, of course, intended to cover by the appended claims all such modifications as fall within the scope of the claims.

I claim:

1. A method for draining whey from cheese curd particles for manufacturing large sized blocks of cheese comprising the steps of:

(a) providing an open ended pressing container mold lined with a flexible plastic material;

(b) enclosing the bottom open end of said container with a drain plate defining a plurality of apertures;

(c) positioning an internal drain screen means comprising two plates having a multiplicity of openings for the whey to pass through and being substantially parallel and spaced apart by dimples defined in said plates centrally onto said drain plate and over and in fluid communication with apertures in the drain plate; said internal drain screen means extending substantially the height of the container mold;

(d) filling said container with said cheese curd particles containing whey;

(e) permitting said cheese curd particles to settle and a quantity of whey to drain due to the weight of said cheese curd;

(f) applying a first pressure to said cheese curd particles by inserting a spreading spade with a press plate into said container wherein said spreading spade inserted between said parallel plates moves apart said internal drain screen means and thereby exerts a horizontal force on said curd particles and at the same time said press plate exerts a vertical force on said curd particles thus causing additional whey to drain;

(g) removing said press plate and said spreading spade from said container;

(h) pressing said curd particles for a second time with a perforated follower plate;

(i) removing said follower plate from said container exposing a surface of cheese curd particles;

(j) covering the now exposed cheese curd particles with a flexible plastic sheet said sheet overlapping with said flexible plastic liner;

(k) inserting a bottom lid over said flexible plastic sheet;

(l) placing a leg bracket over said bottom lid;

(m) inverting said container;

(n) removing said drain plate from said inverted container to expose a second surface of cheese curd;

(o) covering the second surface of exposed cheese curd with a second flexible sheet said sheet overlapping with said flexible plastic liner;

(p) placing a follower board inside said container on top of said second flexible sheet;

(q) strapping said follower board with coil springs which exert a force onto said follower board; and (r) placing said container into a vacuum chamber thereby removing air bubbles trapped in said flexible plastic liner to form a skin tight sealed package and further compressing said curd.

2. A method in accordance with claim 1 including holding said internal drain screen means substantially vertical and erect in said container by centering brackets until the container is filled with cheese curd particles.

3. A method in accordance with claim 1 including removing said centering brackets when said internal drain screen means is sufficiently supported by said cheese curd particles in said container.

4. A method in accordance with claim 1 including applying the first pressure to said curd particles of approximately 15 to 20 pounds per square inch for about 3 to 5 minutes.

5. A method in accordance with claim 1 including vacuuming draining whey expelled through said drain plate of said container.

6. A method in accordance with claim 1 including engaging said internal drain screen means to said press plate after applying said first pressure whereby when said press plate is removed from said container said internal drain screen means is extracted from said container.

7. A method in accordance with claim 1 including lining a side of said drain plate facing the interior of said container with a sheet of permeable plastic weave whereby whey will pass through said weave and retain said curd particles.

8. A method in accordance with claim 1 including reducing atmosphere pressure in said vacuum chamber by approximately 27 inches mercury.

* * * * *

UNITED STATES PATENT OFFICE
CERTIFICATE OF CORRECTION

Patent No. 4,263,330　　　　　　　　Dated April 21, 1981

Inventor(s) Robert R. Streeter, Vincent J. Whitehorn, Carl C. Nicholas

It is certified that error appears in the above-identified patent and that said Letters Patent are hereby corrected as shown below:

Column 2, line 4, "and" second occurrence should be -- an --.

Column 5, line 57, "molds" should be --mold--.

Column 11, line 67,

"From the foregoing detailed description it will be" should be inserted before "observed".

Signed and Sealed this

Eleventh Day of August 1981

[SEAL]

Attest:

GERALD J. MOSSINGHOFF

Attesting Officer　　　Commissioner of Patents and Trademarks